United States Patent
Sano (10) Patent No.: US 6,690,887 B1
(45) Date of Patent: *Feb. 10, 2004

(54) WIRELESS NON-CONNECTION COMMUNICATION APPARATUS AND CONTROL METHOD THEREFOR

(75) Inventor: Shinya Sano, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 09/401,648

(22) Filed: Sep. 23, 1999

(30) Foreign Application Priority Data

Sep. 24, 1998  (JP) ............................................. 10/269417

(51) Int. Cl.$^7$ ............................................... H04B 10/00
(52) U.S. Cl. .................... 398/127; 398/106; 398/135; 398/140
(58) Field of Search ................ 359/152, 118, 359/154, 143, 174, 180, 189; 455/560, 466, 41, 574, 557; 370/338; 340/3.1, 3.4; 398/127, 135, 106, 140, 138, 128, 107, 108, 111, 151

(56) References Cited

U.S. PATENT DOCUMENTS

| | | | | | |
|---|---|---|---|---|---|
| 4,004,277 | A | * | 1/1977 | Gavril ......................... | 710/23 |
| 4,114,027 | A | * | 9/1978 | Slater et al. ................ | 340/5.41 |
| 4,685,124 | A | * | 8/1987 | Smitt et al. ............... | 379/93.04 |
| 6,182,163 | B1 | * | 1/2001 | Yamashita et al. .......... | 709/208 |
| 6,243,579 | B1 | * | 6/2001 | Kari ........................... | 370/320 |
| 6,411,813 | B1 | * | 6/2002 | Sano ........................... | 370/338 |

FOREIGN PATENT DOCUMENTS

| WO | WO 96/12358 | 4/1996 |
|---|---|---|
| WO | WO 97/26721 | 7/1997 |

* cited by examiner

Primary Examiner—Nina Tong
(74) Attorney, Agent, or Firm—Young & Thompson

(57) ABSTRACT

A wireless communication device supporting at least non-connection communication and a control method therefore are disclosed. It is determined whether a request for non-connection communication occurs and, when the communication request occurs during an online mode, the online mode is changed to an offline mode in response to occurrence of the communication request, and then the non-connection communication is started. When the communication request occurs, the Auto-Find-IAS function is disabled to prevent undesired connection to another device.

7 Claims, 9 Drawing Sheets

WIRELESS NON-CONNECTION COMMUNICATION APPARATUS AND CONTROL METHOD THEREFOR

BACKGROUND OF THE INVENTION

1. Field of the Invention

The present invention generally relates to wireless data communications techniques, and in particular to a communication protocol for a wireless data communication device supporting at least non-connection data communication.

2. Description of the Related Art

As a communication protocol, connection and non-connection communication protocols have been known. In the connection communication protocol, one party identifies another party to communicate with before communicating with the identified party, which is called "Connection Write" in the IrMC (Infrared Mobile Communications) standard (see "Telecom Specification"). The IrMC standard has been introduced by the Infrared Data Association (IrDA), defining common data exchange formats and protocols for interoperability in mobile communications devices such as a mobile telephone, a mobile personal computer, and the like. In the non-connection communication protocol, on the other hand, the one party transmits data to another party in only one direction without identifying the destination, which is called "Ultra Write" in the IrMC standard.

A mobile communication device having the infrared communication function as mentioned above alternately performs ON-LINE operation (search mode) and OFF-LINE operation (off mode) in a predetermined period. More specifically, in the search mode, the device transmits a Query signal for informing another device of its own information such as device name, and then changes into normal discovery mode (NDM) to wait for a Query signal to be received from another device. According to IrMC standard, the Query signal is supposed to be consecutively transmitted three times before the NDM.

When receiving a Query signal from another device during the NDM period, the device determines whether the other device is permitted to be connected. If permitted, a connection request signal is transmitted to the other device or it may be received from the other device. Since the Auto-Find-IAS of a mobile communication device conforming to the IrMC standard defaults to "Enable", the IAS (Information Access Service) search is automatically started when receiving the connection request signal from the other device. In other words, upon reception of the connection request, the device automatically and periodically transmits IAS to the other device to determine whether communication can be established between them.

According to the non-connection communication protocol, however, the non-connection communication cannot be performed during the ON-LINE operation. Therefore, as shown in FIG. 4B, when a non-connection communication request occurs during the ON-LINE operation, an error state is generated and thereby the non-connection communication is not permitted until the ON-LINE operation has been completed.

Further, in the case where the device has been discovered by the other device receiving the Query signal transmitted by the device, the device automatically transmits the IAS to the other device when receiving the connected request from the other device. Therefore, even if the other device is an undesired device to communicate with, the IAS is automatically transmitted to the other device.

SUMMARY OF THE INVENTION

An object of the present invention is to provide a wireless non-connection data communication apparatus and a control method therefor, which can promptly respond to a non-connection communication request.

Another object of the present invention is to provide a wireless non-connection data communication apparatus and a control method therefor, which can ensure security in communications.

According to the present invention, a control method for a wireless communication device which has an online mode and an offline mode and supports at least non-connection communication which is allowed in the offline mode, comprises the steps of: a) determining whether a request for the non-connection communication occurs; b) when the communication request occurs during the online mode, changing the online mode to the offline mode in response to occurrence of the communication request; and c) starting the non-connection communication.

When a non-connection communication request occurs during connection communication with another wireless communication device, it is preferably that the connection communication is disconnected and the non-connection communication is started in response to the non-connection communication request.

According to anther aspect of the present invention, a control method for the wireless communication device comprises the steps of: a) determining whether a request for the non-connection communication occurs; b) when the communication request occurs, setting a communication mode to a no-response mode in response to occurrence of the communication request, wherein the no-response mode provides no response to a request received from another communication device; c) when the communication request occurs during the online mode, changing the online mode to the offline mode in response to occurrence of the communication request; and d) starting the non-connection communication.

The no-response mode may be set by disabling an Auto-Find-IAS function conforming to IrMC (Infrared Mobile Communications) standard.

Since the online operation is halted when the non-connection communication request occurs, the non-connection communication can be promptly started, resulting in reduced power consumption.

Further, since the apparatus is set to the no-response mode in response to the non-connection communication request, undesired connection can be prevented, resulting in Improved security.

DETAILED DESCRIPTION OF THE PREFERRED EMBODIMENTS

Figure 1A:
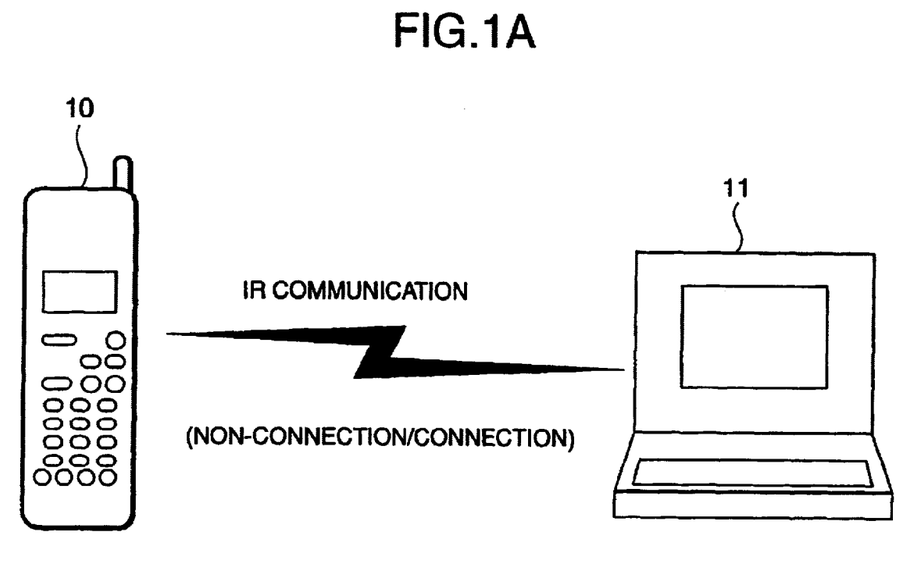
FIG. 1A is a diagram showing an infrared communication system implementing an infrared data communication method according to the present invention.

Referring to FIG. 1A, a mobile telephone 10 and a personal computer (PC) 11 can communicate with each other by infrared rays according to connection and non-connection communication protocols. Such a device having an infrared communication function is not restricted to the mobile telephone 10 and PC 11. Other information processing devices may be used.

Figure 1B:
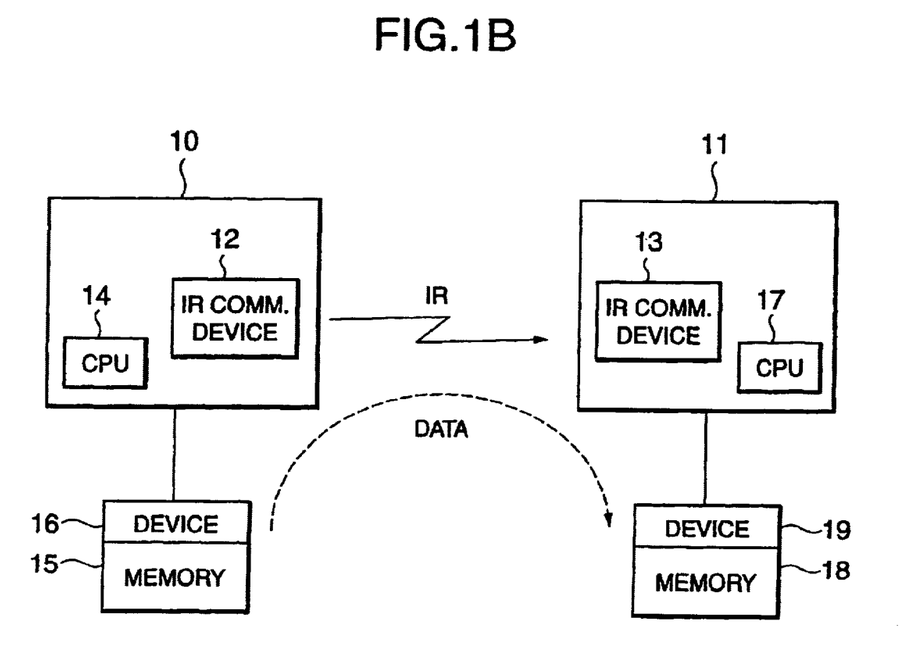
FIG. 1B is a schematic block diagram showing an operation of the infrared communication system of FIG. 1A.

As shown in FIG. 1B, the mobile telephone 10 and PC 11 are provided respectively with IR communication devices 12 and 13 to perform IR communications. The mobile telephone 10 is provided with a processor (CPU) 14, which controls the operations of the mobile telephone. In this system, a memory 15 can be detachably connected to the mobile telephone 10 through a device 16 The processor 14 can access the contents of the memory 15. Similarly, the PC 11 is provided with a processor (CPU) 17, which controls the operations of the PC. In this system, a memory 18 can be detachably connected to the PC 11 through a device 19. The processor 17 can access the contents of the memory 18.

Hereinafter, taking the above system as shown in FIG. 1B as an example, the details of the non-connection infrared communication from the mobile telephone 10 to the PC 11 according to the present invention will be described with reference to the drawings.

Figure 2:
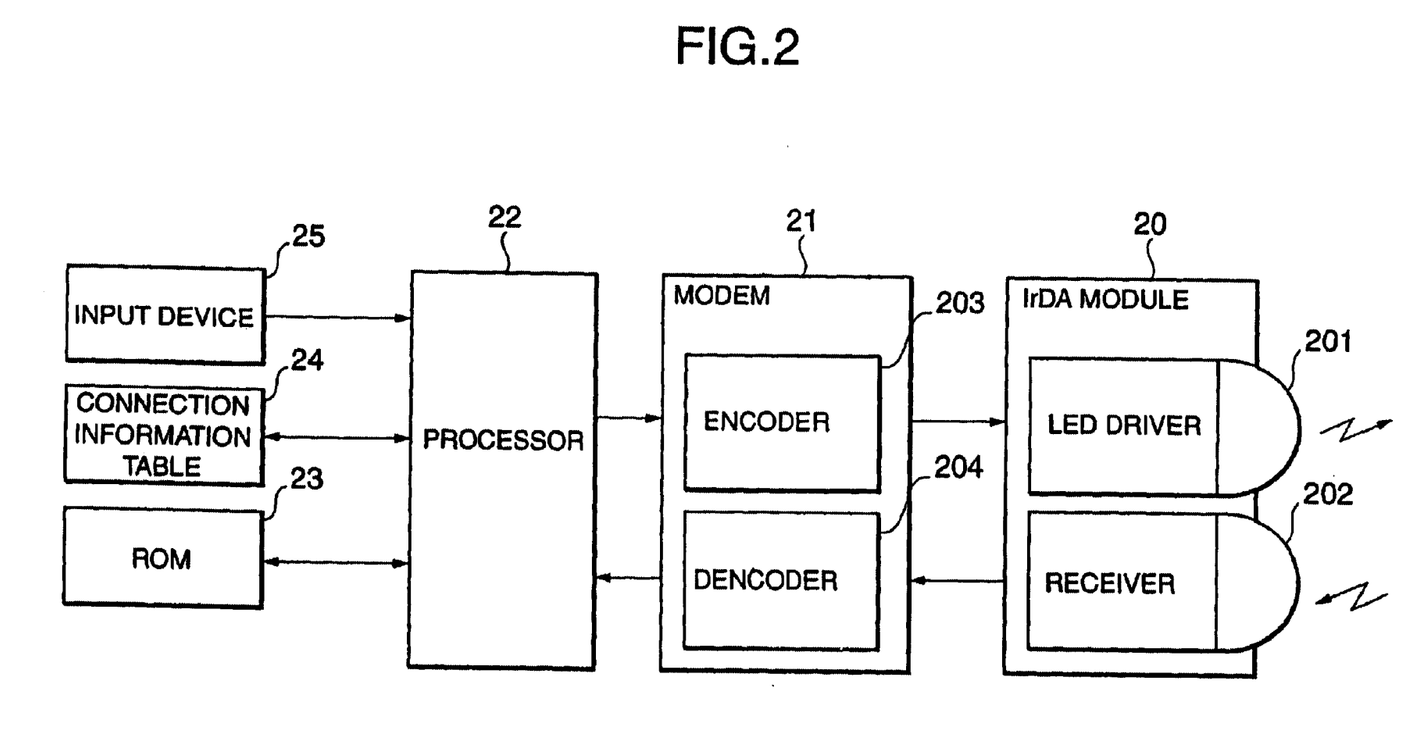
FIG. 2 is a block diagram showing an infrared communication device used in the infrared communication system of FIG. 1B.

FIG. 2 shows the internal circuit of a communication device which may be one of the mobile telephone 10 and the PC 11. The communication device is provided with an IrDA module 20 for transmitting and receiving an infrared signal. The IrDA module 20 includes an LED connected to an LED driver 201 and a photo detector connected to a receiver 202. The communication device is further provided with a modem 21 through which the IrDA module 20 is connected to a processor 22. The modem 21 includes an encoder 203 and a decoder 204 which are connected to the LED driver 201 and the receiver 202 of the IrDA module 20, respectively. The IrDA module 20 and the modem 21 are controlled by the processor 22.

The processor 22 may be a program-controlled processor such as CPU on which control programs run to do the entire control of the communication device. The control programs stored in a read-only memory (ROM) 23 include an infrared communication control program according to the present invention. The processor 22 performs the IR communication control using a connection information table 24 stored in a random access memory (RAM) and inputs an instruction such as a non-connection communication request from a user through an input device 25 such as a keypad or a pointing device. The connection information table 24 contains information of devices connected on logical data paths and information of class and attribute of applications. The connection information table 24 is used for search and discovery negotiation in ON-LINE operation.

The communication protocol according to the present invention will be described in detail.

Figure 3:
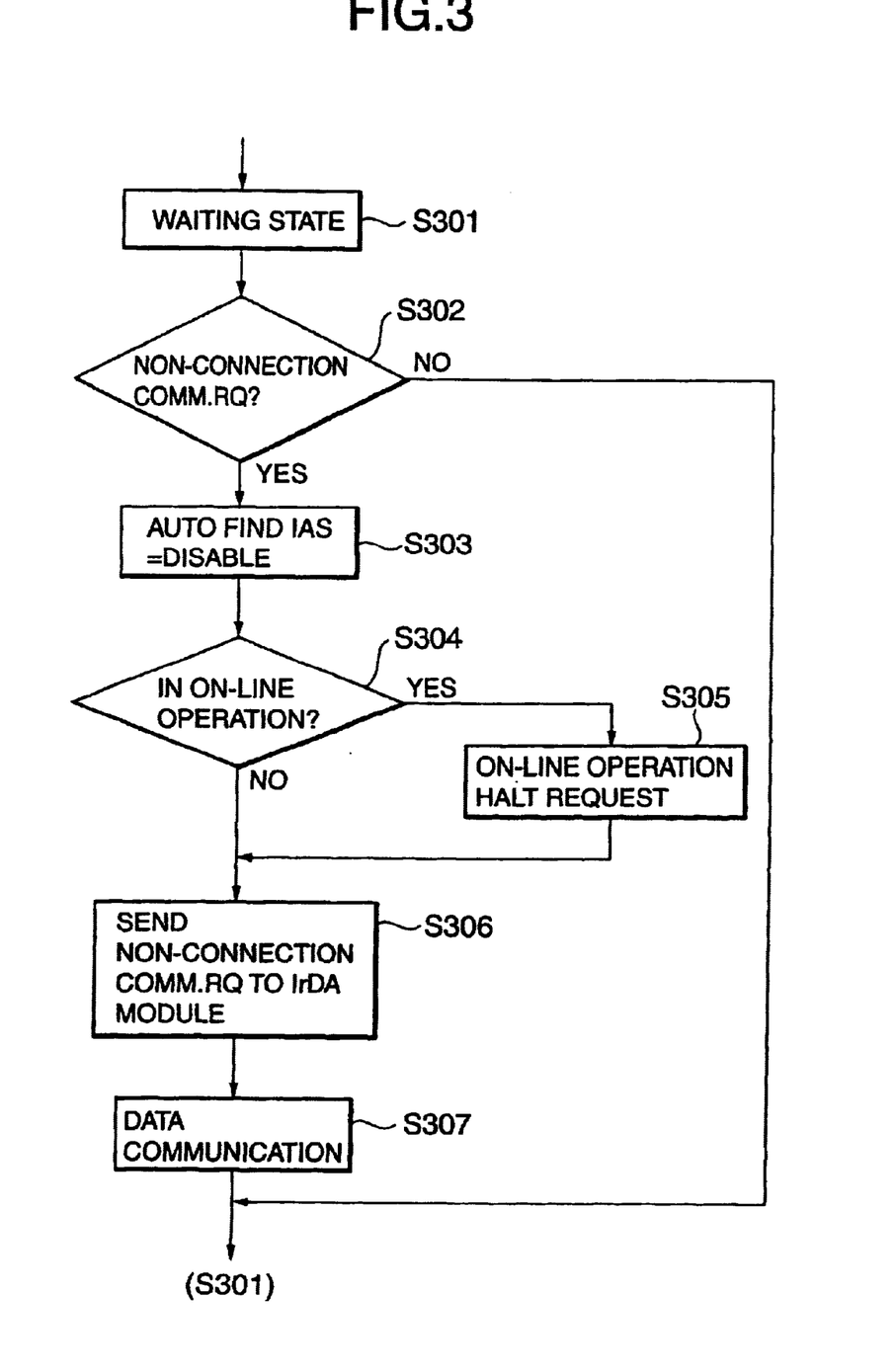
FIG. 3 is a flow chart showing an infrared non-connection communication method according to a first embodiment of the present invention.

Referring to FIG. 3, in the case of waiting state (step S301), the processor 22 checks whether a non-connection communication request is received from the input device 25 (step S302). When receiving the non-connection communication request (YES in step S302), the processor 22 sets the Auto-Find-IAS to "Disable" (step S303). This causes the IAS to be inhibited from being sent back to the other device in response to a connection request received from the other device.

Thereafter, it is further determined whether the ON-LINE operation is being done (step S304). When in ON-LINE operation (YES in step S304), the processor 22 sends an ON-LINE operation halt request to the IrDA module 20 (step S305). When in OFF-LINE operation (NO in step S304) or after the ON-LINE operation halt request has been sent to the IrDA module 20 (step S305), the processor 22 sends a non-connection communication request to the IrDA module 20 (step S306) and then the non-connection data communication is started (step S307). When the non-connection data communication has been completed, the processor 22 is changed to the waiting mode. In this way, the non-connection communication control is performed as shown in FIG. 4A.

Figure 4A:
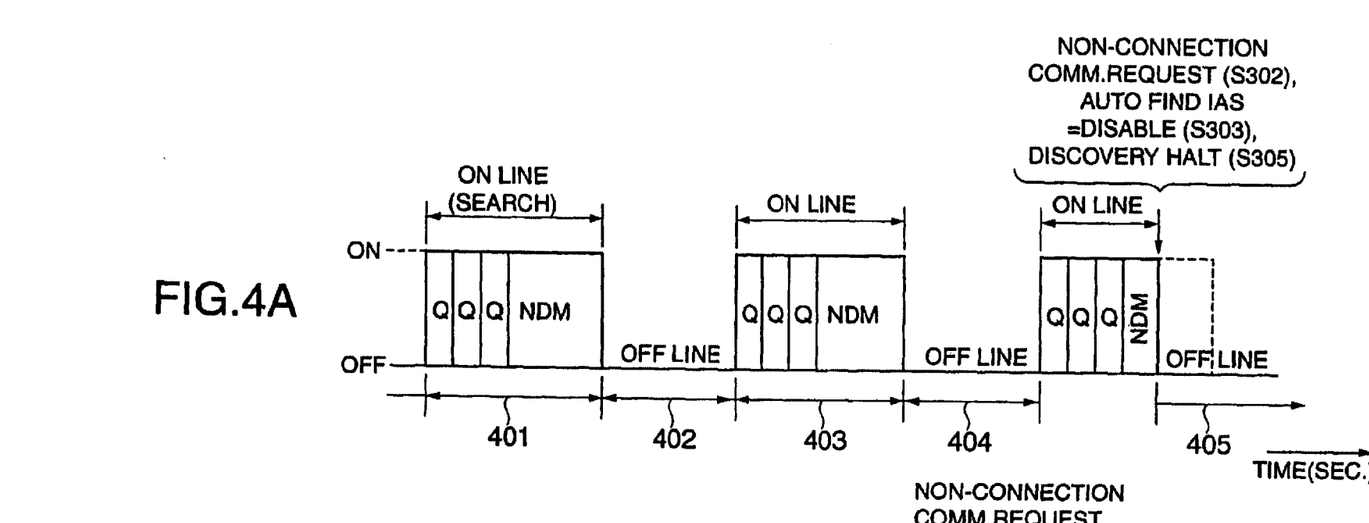
FIG. 4A is a time chart showing an operation of the first embodiment.
Figure 4B:
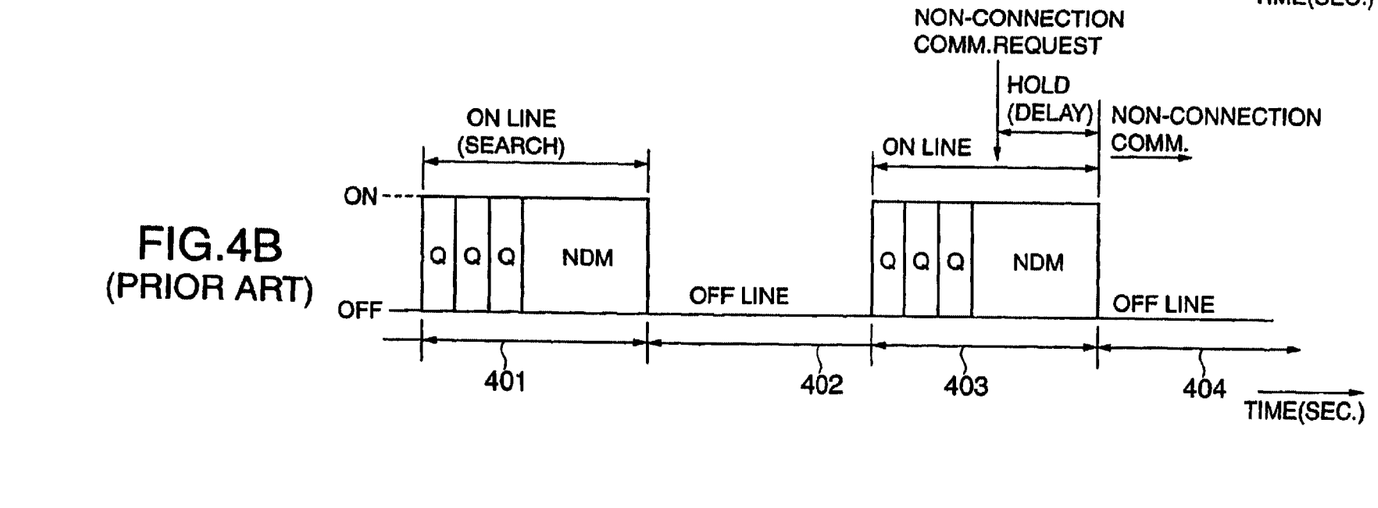
FIG. 4B is a time chart showing a conventional infrared communication method.

As shown in FIG. 4A, the processor 22 alternately performs ON-LINE operation (401, 403) and OFF-LINE operation (402, 404) at predetermined intervals. In each ON-LINE operation, the processor 22 produces a query signal Q which is to be transmitted. The query signal Q conveys information of the communication device itself, for example, Device Nick Name including the IrMC function level of the communication device itself. Thereafter, the processor 22 changes the operation mode to the normal discovery mode (NDM) to wait for a query signal Q of the other device and, when receiving the query signal Q of the other device, performs the response protocol control for searching, selecting, and current connection control in the NDM. In FIG. 4A, ON-LINE operations 401 and 403 indicate that no communication device to communicate with is found.

Since a non-connection communication request is made by a user, there are cases where the non-connection communication request occurs during an ON-LINE operation. When receiving the non-connection communication request from the input device 25, the processor 22 forces the current ON-LINE operation to be turned off, that is, changes ON-LINE to OFF-LINE (S305). Therefore, a non-connection communication operation 405 can be started immediately after the non-connection communication request occurs.

In contrast, as shown in FIG. 4B, according to the prior art, when a non-connection communication request occurs during the ON-LINE operation 403, the non-connection communication is not permitted until the ON-LINE operation 303 has been completed, resulting in delayed data transmission, for example, a delay of several seconds. According to the embodiment of the present invention, prompt non-connection data transmission (for example, a delay of several milliseconds) can be performed even if the non-connection communication request occurs during the ON-LINE operation 403.

Further, when the non-connection request occurs, the Auto-Find-IAS is set to "Disable" (step S303). Therefore, the IAS is inhibited from being sent back to the other device in response to a connection request received from the other device. This causes the discovery by the other device to be prevented.

Figure 5:
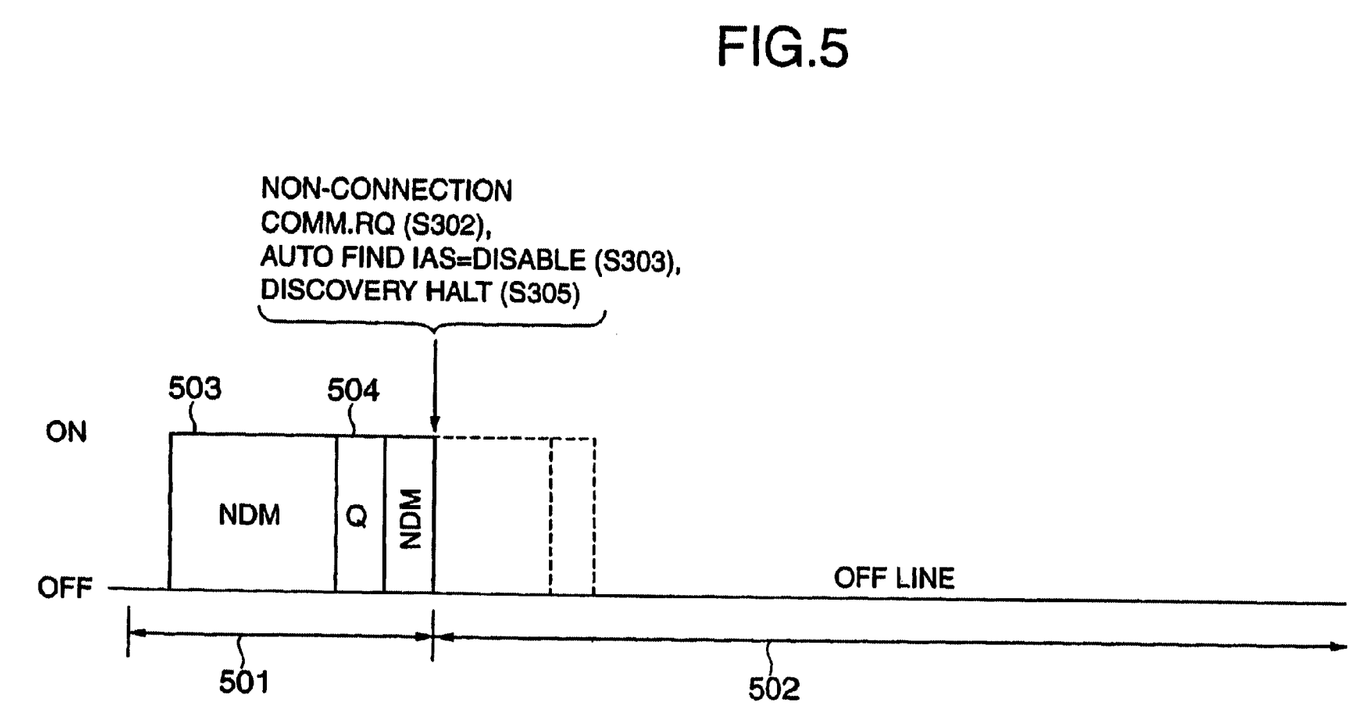
FIG. 5 is a sequence diagram showing an operation of a second embodiment of an infrared communication method according to the present invention.

Referring to FIG. 5, when receiving a query signal Q from another device during the ON-LINE period 501, the device performs discovery negotiation including NDM 503 and query transmission 504 by referring to the connection Information table 24. When receiving the non-connection communication request from the input device 25 during the ON-LINE period 501, the processor 22 forces the current ON-LINE operation to be turned off, that is, changes ON-LINE to OFF-LINE (S305). Therefore, a non-connection communication operation 405 can be started immediately after the non-connection communication request occurs.

Further, when the non-connection request occurs, the Auto-Find-IAS is set to "Disables" (step S303). Therefore, the IAS is inhibited from being sent back to the other device in response to a connection request received from the other device.

Figure 6:
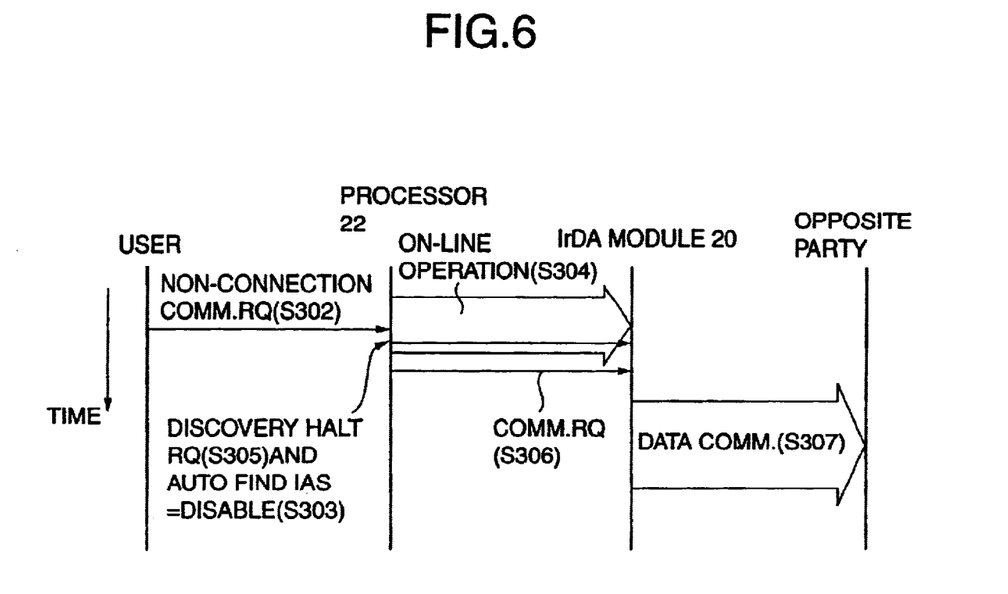
FIG. 6 is a sequence diagram showing an operation of the first and second embodiments.

Referring to FIG. 6, assuming that the ON-LINE operation is being done (S304) and a non-connection communication request is made by a user (S302). When receiving the non-connection communication request from the input device 25, the processor 22 sends a discovery halt request to the IrDA module 20 to stop the search operation (S305). Thereafter, the processor 22 sends a communication request to the IrDA module 20 to start the non-connection communication (S306, S307).

Figure 7:
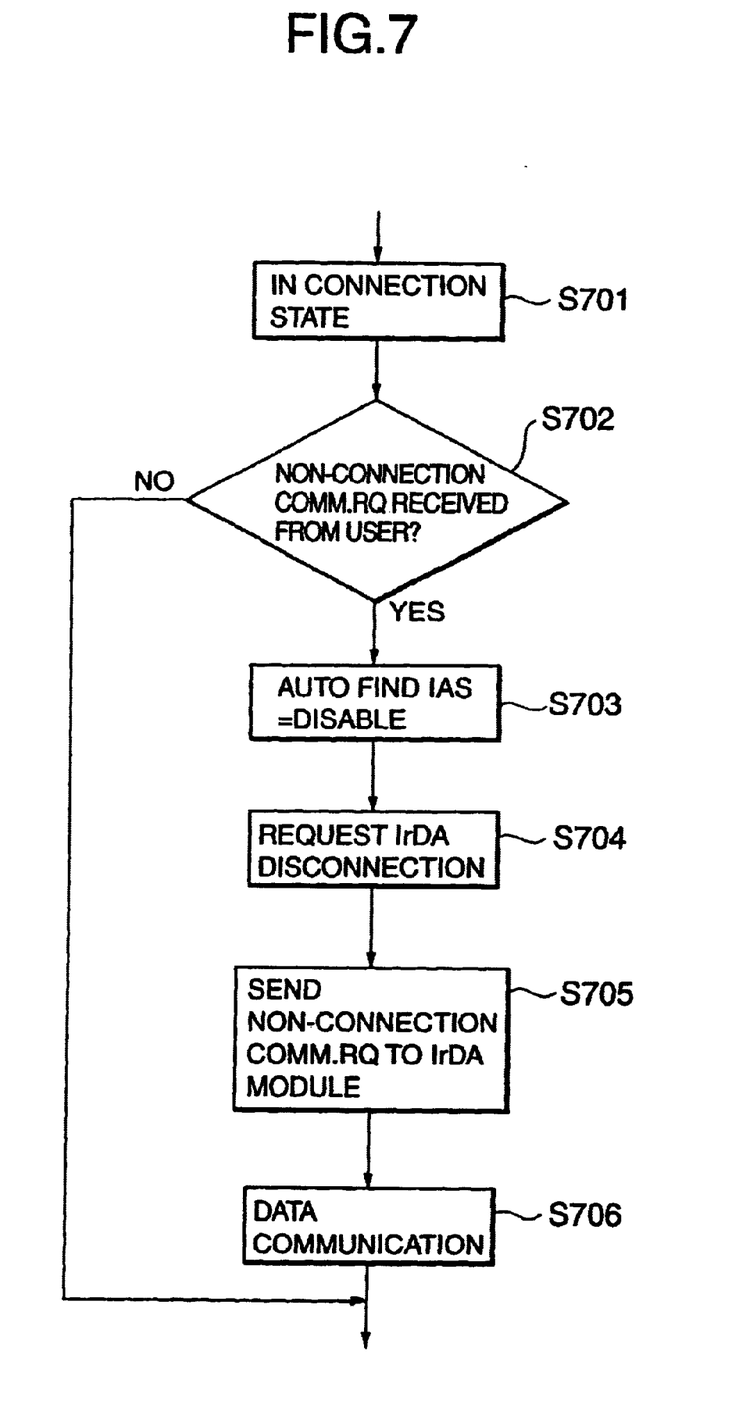
FIG. 7 is a flow chart showing an infrared non-connection communication method according to a third embodiment of the present invention.

Referring to FIG. 7, the processor 22 performs the communication protocol control when a non-connection communication request occurs. In the case of connection state (step S701), the processor 22 checks whether a non-connection communication request is received from the input device 25 (step S702). When receiving the non-connection communication request (YES in step S702), the processor 22 sets the Auto-Find-IAS to "Disable" (step S703). As described before, this causes the IAS to be inhibited from being sent back to the other device In response to a connection request received from the other device.

Thereafter, the processor 22 sends an IrDA disconnection request to the IrDA module 20 (step S704). After the operation mode is changed from the connection state to the OFF-LINE mode, the processor 22 sends a non-connection communication request to the IrDA module 20 (step S705) and then the non-connection data communication is started (step S706).

When the non-connection data communication has been completed, the processor 22 can be changed to the waiting mode. Alternatively, reconnection to the previous opposite party can be also made. In the case of the reconnection control, the ROM 23 stores the reconnection control program for restoring the previous connection and restarting the data transfer.

Figure 8:
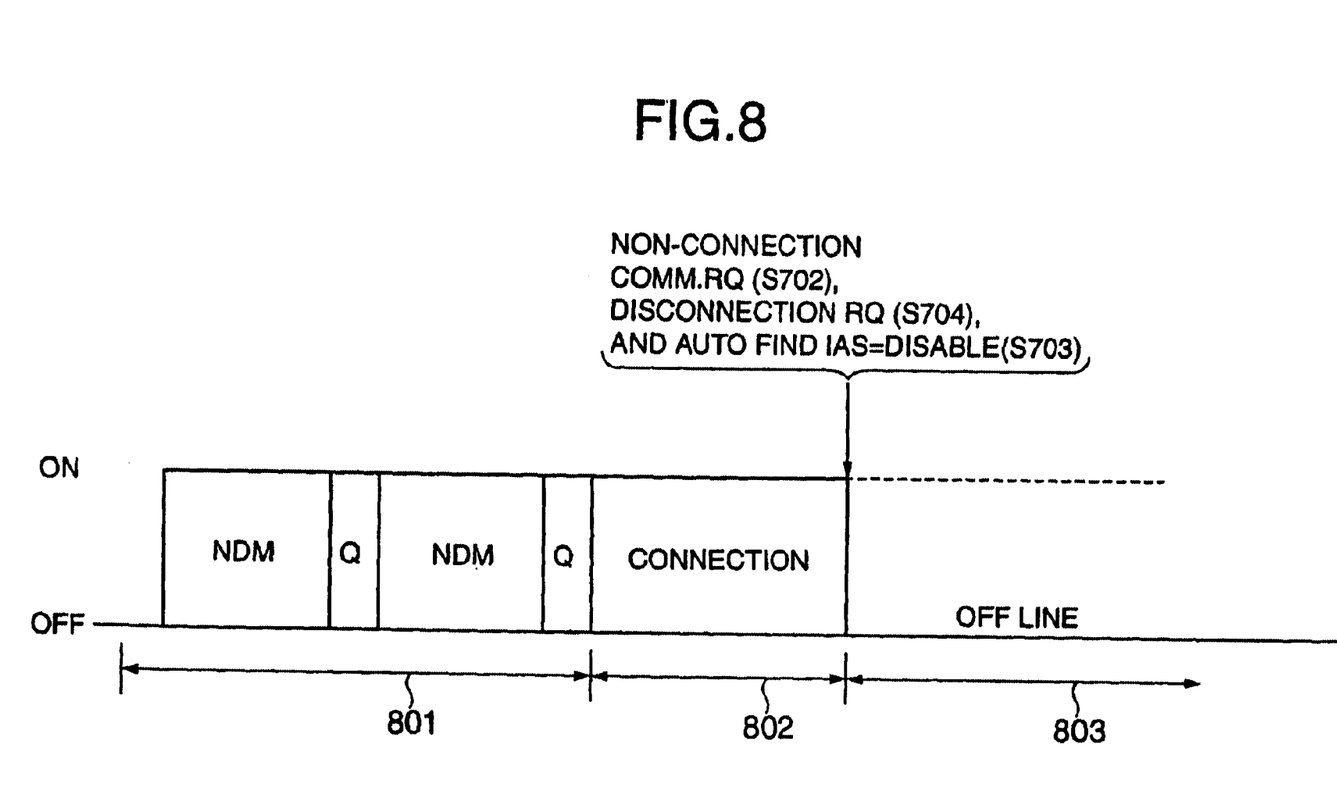
FIG. 8 is a time chart showing an operation of the third embodiment.

Referring to FIG. 8, when receiving a query signal Q from another device during the NDM period, the device performs discovery negotiation and query transmission during the ON-LINE period 801 by referrlng to the connection information table 24. When the negotiation has been successfully completed, the mode is changed to the connection state In which the device can communicate with the specific device during the connection period 802. When receiving the non-connection communication request from the input device 25 during the connection state, the processor 22 sets the Auto-Find-IAS to "Disable" (step S703) and sends a disconnection request to the IrDA module 20 (S704), so that the non-connection communication can be performed without discovered by another device. Therefore, a non-connection communication operation can be started immediately after the non-connection communication request occurs.

Figure 9:
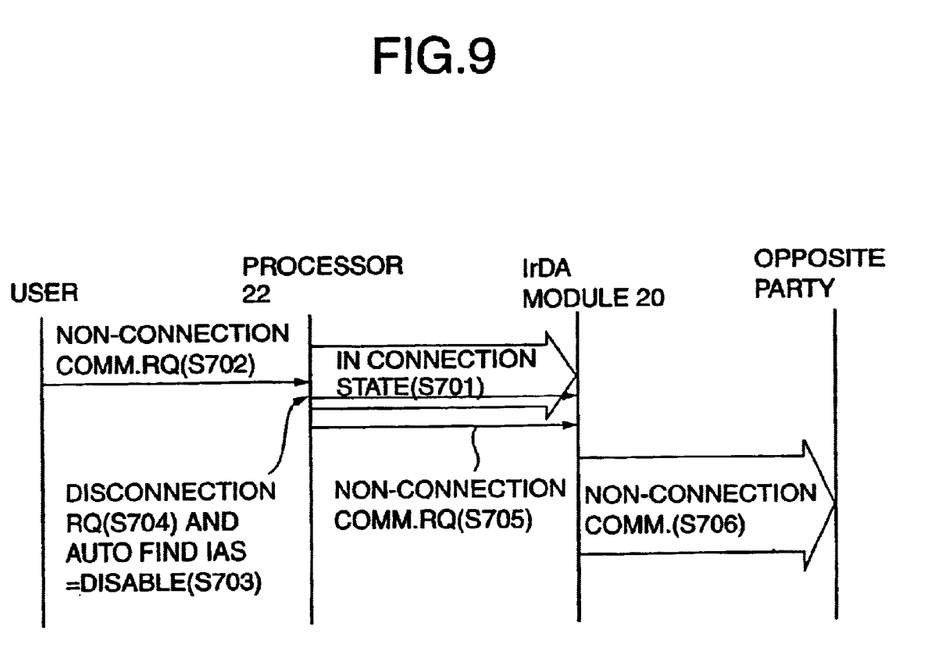
FIG. 9 is a sequence diagram showing an operation of the third embodiment as shown in FIG. 8.

Referring to FIG. 9, when the non-connection communication is requested by the user through the input device 25 during the connection state, the processor 22 sets the Auto-Find-IAS to "Disable" (step S703) and sends a disconnection request to the IrDA module 20 (S704). When receiving the disconnection request from the processor 22. the IrDA module 20 transmits the disconnection request to the opposite party. After the connection to the opposite party has been disconnected, the processor 22 sends a communication request to the IrDA module 20 to start the non-connection communication (S706).

As described above, according to the present invention, the non-connection communication can be performed smoothly in response to the user's request, resulting in reduced power consumption. In other words, priority is given to the non-connection communication Further, since the Auto-Find-IAS is set to "Disable" in response to the non-connection communication request, undesired connection can be prevented, resulting in improved security.

What is claimed is:

1. A control method for a wireless communication device which has an online mode and an offline mode and supports at least non-connection communication which is allowed in the offline mode, wherein the communication device is a mobile communication station having an infrared communication function, the method comprising the steps of:
   a) determining whether a first request for the non-connection communication occurs;
   b) when the first request occurs during the online mode, interrupting the online mode and changing to the offline mode immediately in response to the first request and when the first request occurs during connection communication with another wireless communication device, disconnecting the connection communication; and
   c) starting the non-connection communication in response to the first request.

2. A method according to claim 1, wherein the non-connection communication conforms to IrMC Infrared Mobile Communications standard.

3. A control method for a wireless communication device which has an online mode and an offline mode and supports at least non-connection communication which is allowed in the offline mode, wherein the communication device is a mobile communication station having an infrared communication function, the method comprising the steps of:
   a) determining whether a first request for the non-connection communication occurs;
   b) when the first request occurs, immediately setting a communication mode to a no-response mode in response to the first request, wherein the no-response mode provides no response to a request received from another communication device;
   c) when the first request occurs during the online mode, changing the online mode to the offline mode in response to the first request; and
   d) starting the non-connection communication.

4. A method according to claim 3, wherein the no-response mode is set by disabling an Auto-Find-IAS information assess service function conforming to IrMC Infrared Mobile Communications standard.

5. A wireless mobile communication station having an infrared communication function and an online mode and an offline mode and supporting at least non-connection communication which is allowed in the offline mode, comprising:
- a transceiver for transmitting and receiving data to and from another wireless communication apparatus;
- an input device for inputting an instruction; and
- a communication controller controlling such that when a first request for non-connection communication occurs during the online mode, the online mode is interrupted and immediately changed to the offline mode in response to the first request,
- wherein the communication controller controls such that when the first request occurs during connection communication with another wireless communication device, the connection communication is disconnected and changed to the offline mode in response to the first request.

6. A wireless communication apparatus according to claim 5, wherein the communication controller further controls such that when the first request occurs, a communication mode is set to a no-response mode in response to the first request, wherein the no-response mode provides no response to a request received from another communication device.

7. A wireless communication apparatus having an online mode and an offline mode and supporting at least non-connection communication which is allowed in the offline mode, wherein the communication apparatus is a mobile communication station having an infrared communication function, comprising;
- a transceiver for transmitting and receiving data to and from another wireless communication apparatus;
- an input device for inputting an instruction; and
- a communication controller controlling such that when a first request for non-connection communication occurs during the online mode, the online mode is changed to the offline mode in response to the first request,
- wherein the communication controller further controls such that when the first request occurs, a communication mode is set to a no-response mode in response to the first request, wherein the no-response mode provides no response to a request received from another communication device,
- wherein the no-response mode is set by disabling an Auto-Find-IAS information assess service function conforming to IrMC Infrared Mobile communications standard.

* * * * *